UNITED STATES PATENT OFFICE.

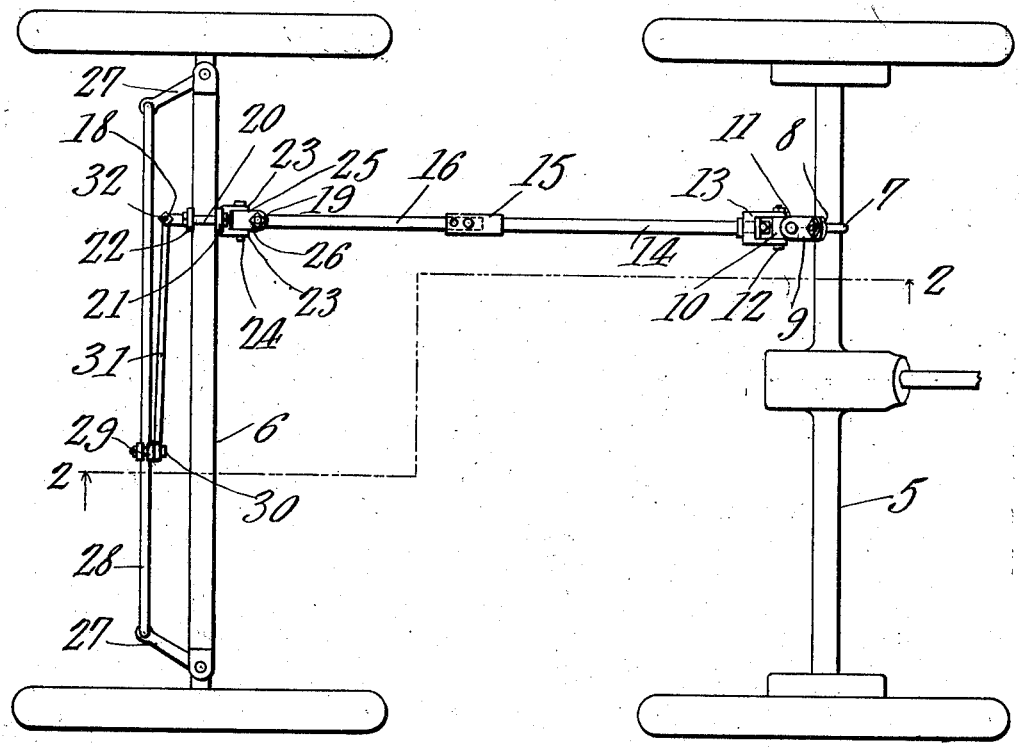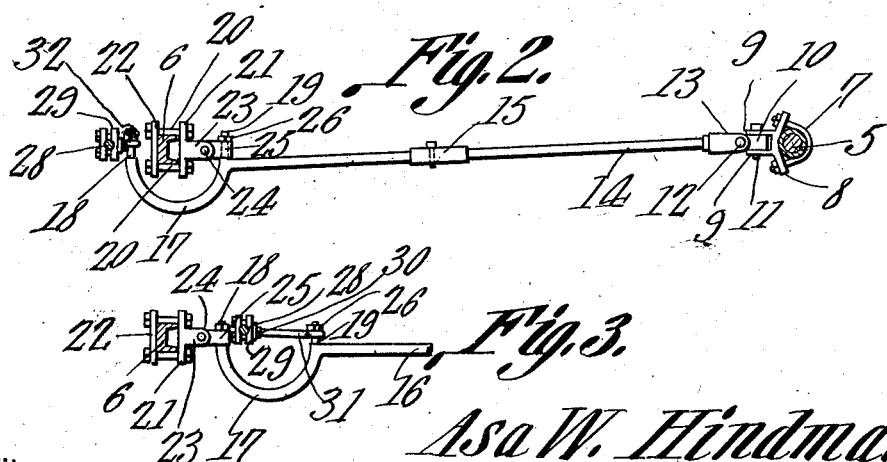

ASA W. HINDMAN, OF CHESTER, NEBRASKA.

COUPLING AND STEERING DEVICE 986,568.

Specification of Letters Patent. Patented Mar. 14, 1911.

Application filed August 3, 1910. Serial No. 575,237.

*To all whom it may concern:*

Be it known that I, ASA W. HINDMAN, a citizen of the United States, residing at Chester, in the county of Thayer and State of Nebraska, have invented a new and useful Coupling and Steering Device, of which the following is a specification.

The device which is the subject of the present invention is designed for coupling two automobiles together, and for steering the hind automobile so that it will properly follow the front one, said steering mechanism being automatic in its operation, so that the services of a driver for the hind car may be dispensed with.

With these objects in view, the invention consists in a novel construction and arrangement of parts to be hereinafter described and claimed, reference being had to the accompanying drawing forming a part of this specification, in which drawing—

Figure 1 is a plan view showing the application of the invention. Fig. 2 is a longitudinal section taken on the line 2—2 of Fig. 1. Fig. 3 is a fragment of a portion of the device showing the same connected up in another manner.

Referring specifically to the drawing, 5 denotes the hind axle of the front automobile which is pulling another automobile, the front axle of the latter being indicated at 6, the last mentioned automobile being behind the first mentioned one, and coupled thereto by the devices which will now be described.

To the axle 5 is secured by means of a U-bolt 7, a clip plate 8 from the rear face of which extend vertically spaced ears 9 between which is pivotally mounted a block 10, the pivot 11 of said block being vertical, so that the block is free to swing in a horizontal plane. To the block 10 is pivotally connected, as indicated at 12, a yoke 13 carried at one end of a rod 14, the pivot 12 being horizontal so that the yoke and the rod may swing in a vertical plane. The block is received between the branches or the yoke, and the pivot 12, which may be a pin or other suitable device, passes through the branches of the yoke, and that portion of the block which is located therebetween. The other end of the rod 14 is connected by a sleeve or other suitable form of coupling 15 to one end of a rod 16, the other end of which rod is connected to the axle 6 of the hind automobile. That end of the rod 16 which is adjacent to the axle 6 is curved downwardly as indicated at 17 to extend beneath the axle, and to the rear of the latter, it terminates in a vertically extending stem or extension 18. A short distance in front of the axle 6, the rod 16 is formed with a vertically extending stem or extension 19.

Secured to the front and rear sides of the axle 6, by means of bolts 20 are clip plates 21 and 22 respectively. The clip plate 21 is formed with horizontally spaced, outstanding ears 23 between which is pivoted, as indicated at 24, a block 25, the pivot being arranged horizontally so that the block is free to swing in a vertical plane. The block has an aperture through which the stem 19 passes. This stem extends a short distance above the block, and on the projecting end thereof is screwed a nut 26, whereby said stem is secured in the aperture of the block.

The steering arms of the hind automobile are indicated at 27, these arms being connected by a rod 28 as usual. To this rod is secured a clip 29 having a stud 30 to which is connected one end of a rod 31, the other end of said rod being connected to the stem 18, said rod being formed with an eye through which the stem extends. The stem extends a short distance above the eye, and on the projecting end is screwed a nut 32 for fastening the rod to the stem.

In Fig. 1 the steering rod 28 is shown as located behind the axle 6. If the invention is applied to an automobile in which this rod is located in front of the axle, the parts connecting the rod 16 to the axle will be arranged as shown in Fig. 3, the stem 18 in this instance being connected to the block 25, which locates the stem 19 in front of said block, and said stem 19 is then connected by the rod 31 to the steering rod 28.

In operation, the parts being connected as shown in the drawing, the hind automobile will properly follow the front one, it being automatically steered by reason of the connection between the coupling device and the steering rod 28. When the front automobile is making a turn, the connecting rods 14 and 16 swing laterally, the axis of this swinging movement being the stem 19, or the stem 18 according to which stem is connected to the block 25. The swing of the rod, through the rod 31, shifts the steering rod 28, and through the steering arms 27 sets the wheels so that the hind automobile will properly follow the front one. The connection between the rod 14 and the axle 5 forms a universal joint, which enables the rods 14 and 16 to swing laterally with respect to the axle 5, in either direction, and also vertically. The same freedom of movement for that end of the rod 16 which is connected to the axle 6 is had by means of the pivoted block 23 and the pivotal connection between said block and the rod. The steering of the hind automobile is entirely automatic, and the services of a driver may therefore be dispensed with. The mechanism is simple and it can be quickly applied, and it effectually serves the purpose for which it is designed.

What is claimed is:

1. A combined coupling and steering device including axle engaging members, a coupling element interposed therebetween, universal connections between said element and the members, a rigid extension integral with said element and spaced from the point of connection between said element and the axle engaging members, and means attached to said extension for transmitting motion to the steering wheels of a vehicle.

2. A connecting and steering device including axle engaging members, a rigid element interposed therebetween, universal connections between said element and the members, said element including an off set portion for extending transversely of an axle, and means attached to said element at points removed from its universal connections, for transmitting motion from said element to the steering wheels of a vehicle.

3. The combination with spaced vehicles, of a coupling and steering device interposed therebetween and including separate elements for engaging the rear axle of one vehicle and the front axle of the other vehicle, a rigid element interposed between the said means, universal connections between the said element and means, and means operated by the movement of said element relative to the front axle to which it is connected, for shifting the steering wheels supporting said axle.

4. The combination with front and rear vehicle, the rear vehicle having a steering mechanism, of a connection between the vehicles, said connection comprising a rod connected at one of its ends with the front vehicle, and the other end of said rod having spaced vertical stems, an apertured block carried by the rear vehicle, in which block one of the stems is pivotally mounted, and a connection between the other stem and the steering mechanism of the rear vehicle for actuating said mechanisms.

5. The combination with the front and rear vehicles, the rear vehicle having a steering mechanism, of a connection between the vehicles, said connection comprising a rod connected at one of its ends with the front vehicle, and the other end of said rod having spaced vertical stems, an apertured block carried by the rear vehicle, in which block one of the stems is pivotally mounted, the block being pivoted to swing in a vertical plane, and a connection between the other stem and the steering mechanism of the rear vehicle for actuating said mechanism.

In testimony that I claim the foregoing as my own, I have hereto affixed my signature in the presence of two witnesses.

ASA W. HINDMAN.

Witnesses:
L. O. SOLDAN,
LURA L. HINDMAN.